United States Patent
Venable, Sr.

(10) Patent No.: US 8,375,117 B2
(45) Date of Patent: Feb. 12, 2013

(54) USING ENDPOINT HOST CHECKING TO CLASSIFY UNMANAGED DEVICES IN A NETWORK AND TO IMPROVE NETWORK LOCATION AWARENESS

(75) Inventor: Jeffrey C. Venable, Sr., Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 351 days.

(21) Appl. No.: 12/769,023

(22) Filed: Apr. 28, 2010

(65) Prior Publication Data

US 2011/0271319 A1    Nov. 3, 2011

(51) Int. Cl.
*G06F 15/177* (2006.01)
*G06F 15/173* (2006.01)
(52) U.S. Cl. .................................. 709/223; 709/220

(58) Field of Classification Search .................. None
See application file for complete search history.

(56) References Cited

U.S. PATENT DOCUMENTS

| 7,000,012 | B2 | 2/2006 | Moore et al. | 709/220 |
| 7,000,015 | B2 | 2/2006 | Moore et al. | 709/224 |
| 7,007,079 | B2 | 2/2006 | Moore et al. | 709/220 |
| 7,043,540 | B2 | 5/2006 | Moore et al. | 709/220 |
| 2007/0192858 | A1 * | 8/2007 | Lum | 726/22 |
| 2010/0281159 | A1 * | 11/2010 | Boscolo et al. | 709/224 |
| 2010/0306816 | A1 * | 12/2010 | McGrew et al. | 726/1 |

* cited by examiner

*Primary Examiner* — John B. Walsh
(74) *Attorney, Agent, or Firm* — Harrity & Harrity, LLP

(57) ABSTRACT

A device receives, from a managed device, endpoint information associated with an unmanaged device connected to the managed device in a network. The device also receives unmanaged device information that partially identifies the unmanaged device, and completely identifies the unmanaged device based on the endpoint information and the unmanaged device information.

18 Claims, 12 Drawing Sheets

940 ⟶

USING ENDPOINT HOST CHECKING TO CLASSIFY UNMANAGED DEVICES IN A NETWORK AND TO IMPROVE NETWORK LOCATION AWARENESS

BACKGROUND

Network scanning (e.g., using network sensors) and traffic fingerprinting analysis is used to identify clientless or unmanaged assets (e.g., endpoint devices) in a network with varying degrees of confidence and estimation. Examples of such unmanaged devices include printers, voice-over-Internet protocol (VoIP) telephones, IP-enabled door locks, heating ventilation and air conditioning (HVAC) systems, etc. Such unmanaged devices lack a management agent (e.g., a host checking client) used to obtain information for an access control decision (e.g., for accessing a network), to share information with the network, etc.

Furthermore, locations of devices (e.g., managed devices that include a management agent) of a network may be determined using network location awareness. Traditional network location awareness is based strictly upon network analysis and heuristics. However, when such devices physically move to different locations, traditional network location awareness may not provide enough information to the devices beyond network identification.

SUMMARY

According to one aspect, a method may include receiving, by a computing device and from a managed device, endpoint information associated with an unmanaged device connected to the managed device in a network. The method may also include receiving, by the computing device, unmanaged device information that partially identifies the unmanaged device, and completely identifying, by the computing device, the unmanaged device based on the endpoint information and the unmanaged device information.

According to another aspect, a method may include receiving, by a computing device, a first location associated with a first device in a network, and receiving, by the computing device, a second location associated with the first device, where the second location is different than the first location. The method may also include receiving, by the computing device, functionality information associated with a peer device in the network, where the peer device is located adjacent to the second location, and receiving, by the computing device, information associated with a second device connected to the peer device. The method may further include determining, by the computing device, network-related functionality of the peer device based on the functionality information and the second device information.

According to still another aspect, a device may include a memory configured to store instructions and a processor configured to execute instructions in the memory to receive, from a managed device, endpoint information associated with an unmanaged device connected to the managed device in a network. The managed device may be identified by the device and the unmanaged device may be unidentified by the device. The processor may further execute instructions in the memory to receive unmanaged device information that partially identifies the unmanaged device, completely identify the unmanaged device based on the endpoint information and the unmanaged device information, and determine network functionality for the unmanaged device based on identification of the unmanaged device.

According to a further aspect, a network admission control (NAC) device may include a memory configured to store instructions, and a processor configured to execute instructions in the memory to receive a location associated with a first device in a network. The processor may further execute instructions in the memory to receive functionality information associated with a peer device in the network, where the peer device is located adjacent to the location of the first device, receive information associated with a second device connected to the peer device, and determine network-related functionality of the peer device based on the functionality information and the second device information.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Implementations described herein may provide systems and/or methods that use endpoint host checking to classify unmanaged devices in a network and to improve network location awareness. In one implementation, the unmanaged devices of the network may, at some point in time, behaviorally interact with managed devices (e.g., devices that include host checking clients) of the network. At this point in time, a NAC device of the network may identify or classify the unmanaged devices based on the how the managed devices are behaviorally configured to interact with the unmanaged devices (e.g., without using network sensors or traffic fingerprinting analysis).

In another implementation, the managed devices may utilize an installed host check client to perform endpoint integrity checks (e.g., of managed or unmanaged devices). A NAC device may correlate endpoint integrity check information (e.g., using an interface for metadata access point (IF-MAP) protocol). For a particular managed device, the NAC device may correlate endpoint integrity check information associated with peer devices (e.g., managed devices provided physically adjacent to the particular managed device) to more accurately offer ancillary network aware services (e.g., beyond simple network identification).

Network Configuration

Figure 1:
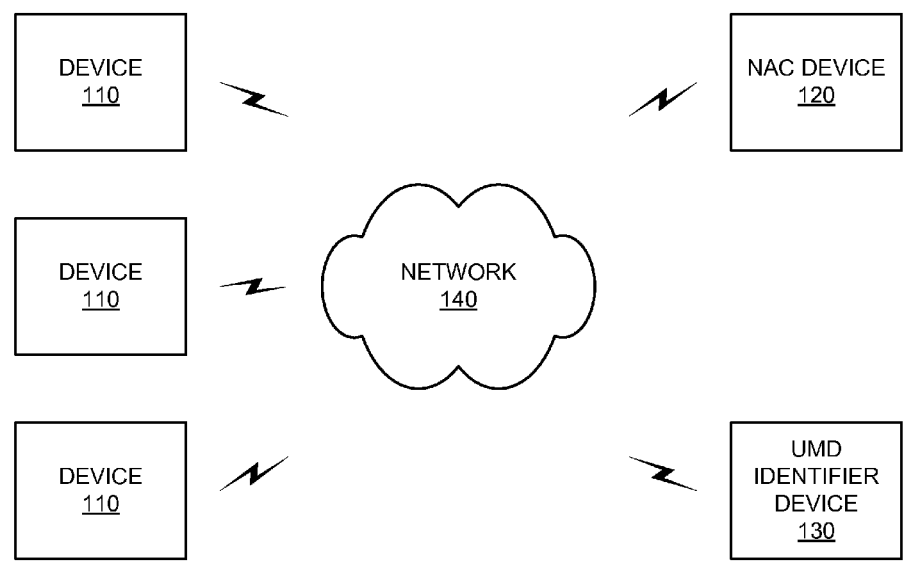
FIG. 1 is a diagram of an example of a network in which systems and/or methods described herein may be implemented.

FIG. 1 is a diagram of an example of a network 100 in which systems and/or methods described herein may be implemented. As illustrated, network 100 may include multiple devices 110, a NAC device 120, and an unmanaged device (UMD) identifier device 130 interconnected by a network 140. Components of network 100 may interconnect via wired and/or wireless connections or links. Three devices 110 and a single NAC device 120, UMD identifier device 130, and network 140 have been illustrated in FIG. 1 for simplicity. In practice, there may be more devices 110, NAC devices 120, UMD identifier devices 130, and/or networks 140. Also, in some instances, one or more of the components of network 100 may perform one or more tasks described as being performed by another one or more of the components of network 100.

Device 110 may include any device that is capable of connecting to and communicating with other devices 110, NAC device 120, UMD identifier device 130, and/or network 140. For example, device 110 may include a mobile communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, a VoIP telephone, etc. In another example, device 110 may include a laptop computer, a personal computer, a tablet computer, a printer, an IP-enabled door lock, a HVAC system, etc. In still another example, device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic.

In one implementation, device 110 may be a managed device that includes a management agent (e.g., a host checking client) used to obtain information for an access control decision (e.g., for accessing network 140), to share information with network 140, etc. In another implementation, device 110 may be an unmanaged device that does not include a management agent (e.g., a host checking client).

NAC device 120 may include one or more server devices, or other types of computation or communication devices, that gather, process, search, and/or provide information in a manner described herein. In one implementation, NAC device 120 may attempt to unify endpoint (e.g., devices 110) security technology (e.g., antivirus, host intrusion prevention, vulnerability assessment, etc.), user or system authentication, and network security enforcement. NAC device 120 may use a set of protocols to define and implement a policy that describes how devices 110 are to securely access network 140 when devices 110 attempt to access network 140. NAC device 120 may integrate an automatic remediation process into network 140, allowing the infrastructure (e.g., routers, switches, firewalls, etc.) of network 140 to work with back end servers and endpoint devices (e.g., devices 110) to ensure that network 140 is operating securely before interoperability is permitted.

In one implementation, NAC device 120 may receive, from a managed device 110, endpoint information associated with an unmanaged device 110 connected to managed device 110 (e.g., via network 140). NAC device 120 may receive (e.g., from UMD identifier device 130) information (e.g., associated with unmanaged device 110) that partially identifies unmanaged device 110, and NAC device 120 may completely identify unmanaged device 110 based on the endpoint information and the unmanaged device information. NAC device 120 may provide further network functionality (e.g., elevated security privileges, network authorization, etc.) to unmanaged device 110 based on the identification of unmanaged device 110.

In another implementation, NAC device 120 may receive a first location associated with a first device 110 in network 100. First device 110 may move to a second location (e.g., different from the first location), and NAC device 120 may receive the second location associated with first device 110. NAC device 120 may receive functionality information associated with one or more peer devices 110 (e.g., in network 100) located adjacent to the second location, and may receive information associated with a second device 110 connected to peer device(s) 110. NAC device 120 may determine network-related functionality of peer device(s) 110 based on the functionality information and/or the second device information, and may provide the determined network-related functionality to first device 110.

UMD identifier device 130 may include one or more server devices, or other types of computation or communication devices, that gather, process, search, and/or provide information in a manner described herein. In one implementation, UMD identifier device 130 may include a device that provides network endpoint discovery services (e.g., similar to services provided by Great Bay Software, Inc.'s Endpoint Profiling technology). For example, UMD identifier device 130 may provide a database of network-attached endpoint devices (e.g., managed and/or unmanaged devices 110) and may assign an identity value to each device 110. UMD identifier device 130 may automatically gather endpoint device information, and may continuously update and maintain contextual information related to each endpoint device 110. This may enable UMD identifier device 130 to continuously certify an identity of each endpoint device 110.

Network 140 may include one or more networks of any type. For example, network 140 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows an example of components of network 100, in other implementations, network 100 may contain fewer components, different components, differently arranged components, or additional components than depicted in FIG. 1.

Device Configuration

Figure 2:
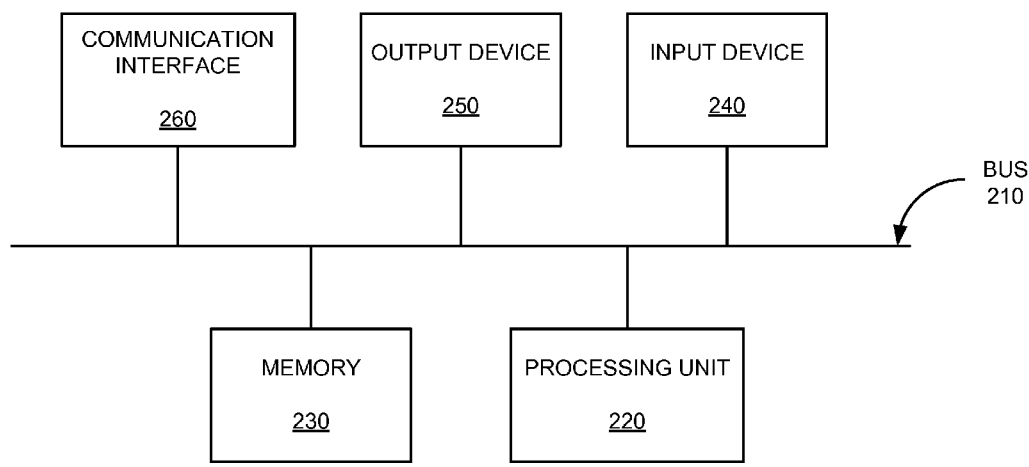
FIG. 2 is a diagram of components of one of the devices of the network depicted in FIG. 1.

FIG. 2 is a diagram of components of a device 200 that may correspond to one of the devices of network 100. As shown, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows an example of components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Network Interactions for Classifying Unmanaged Devices

Figure 3:
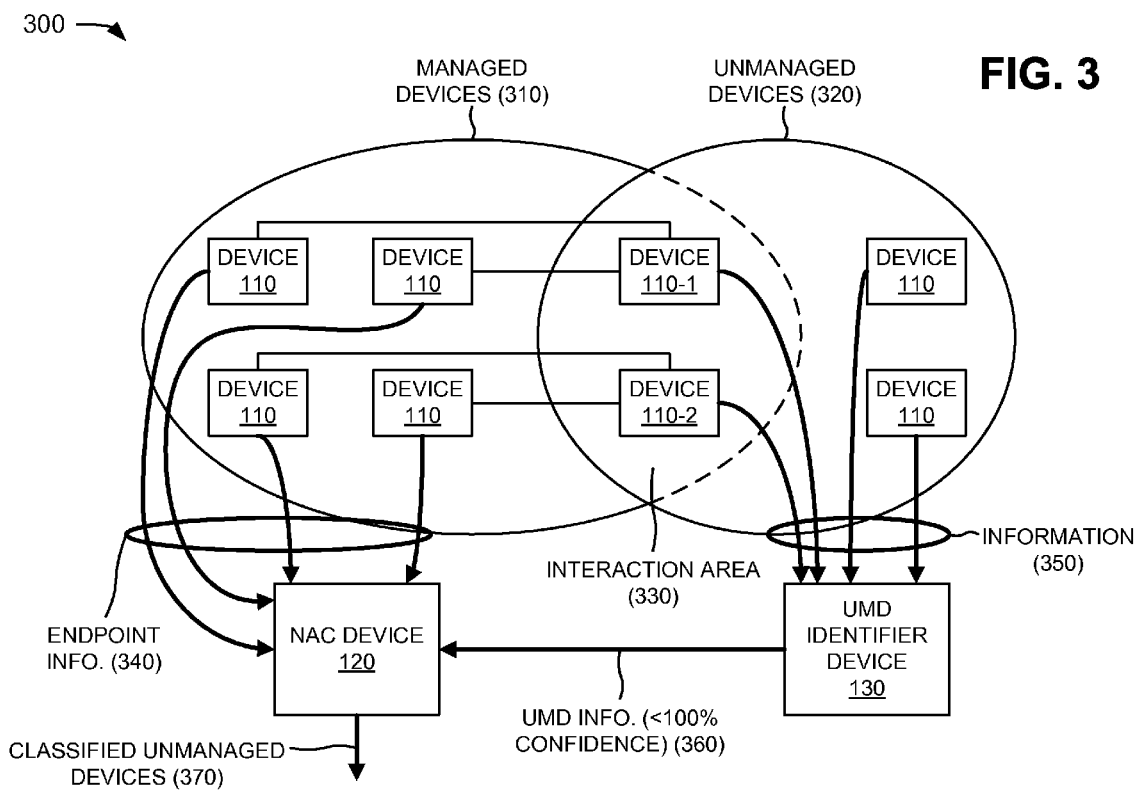
FIG. 3 is a diagram of operations capable of being performed by a portion of the network depicted in FIG. 1.

FIG. 3 is a diagram of operations capable of being performed by a portion 300 of network 100. As shown, network portion 300 may include devices 110, NAC device 120, and UMD identifier device 130. Devices 110, NAC device 120, and UMD identifier device 130 may include the features described above in connection with one or more of FIGS. 1 and 2.

As further shown in FIG. 3, four devices 110 may be managed devices 310 and four devices 110 may be unmanaged devices 320. Managed devices 310 and unmanaged devices 320 may intersect at an interaction area 330. Interaction area 330 may include two unmanaged devices 320 (e.g., devices 110-1 and 110-2) that behaviorally interact with managed devices 310. For example, one or more of managed devices 310 may be connected to devices 110-1 and 110-2, as shown in FIG. 3, and devices 110-1 and 110-2 may be what are referred to as "endpoint devices" for managed devices 310.

Based on interactions with endpoint devices 110-1/110-2, NAC device 120 may receive or extract endpoint information 340 from managed devices 310. Endpoint information 340 may include information obtained from checks to identify configuration settings of managed devices 310 for endpoint devices 110-1/110-2, interactions of managed devices 310 with external devices, and/or other information associated with endpoint devices 110-1/110-2. For example, NAC device 120 may perform a host check to examine installed printers on managed devices 110, and to extract printer driver information, printer network addresses, and other information associated with the installed printers. Such information may be provided to NAC device 120 (e.g., as endpoint information 340), and NAC device 120 may use the information to identify endpoint devices 110-1/110-2 as specific types of printers. In another example, NAC device 120 (e.g., via endpoint information 340) may determine that one of managed devices 310 includes VoIP integration with a Microsoft Office configuration. NAC device 120 may use this information to identify one of endpoint devices 110-1/110-2 as a VoIP telephone as well as to identify an owner of the VoIP telephone.

As further shown in FIG. 3, UMD identifier device 130 may receive information 350 associated with unmanaged devices 320. Information 350 may include information obtained by network sensors (not shown) that may be used to identify unmanaged devices 320. For example, information 350 may include media access control (MAC) and IP address information associated with unmanaged devices 320; network location data associated with unmanaged devices 320; operating system information associated with unmanaged devices 320; manufacturer information associated with unmanaged devices 320; protocol and application usage associated with unmanaged devices 320; etc. UMD identifier device 130 may receive information 350, and may determine UMD information 360 based on information 350. UMD information 360 may include partial identifications (e.g., with a less than 100% confidence level) of unmanaged devices 320. For example, UMD identifier device 130 (e.g., based on information 350) may determine that one of unmanaged devices 320 is a printer but may not be able to identify a type of printer. In one implementation, UMD identifier device 130 may compare information 350 to information contained in a database of network-attached endpoint devices, and may assign an identity value (e.g., UMD information 360) to each of unmanaged devices 320. UMD identifier device 130 may provide UMD information 360 to NAC device 120.

NAC device 120 may receive endpoint information 340 and UMD information 360, and may completely identify or classify unmanaged devices 320 based on endpoint information 340 and UMD information 360, as indicated by reference number 370. In one implementation, NAC device 120 may utilize classification 370 of unmanaged devices 320 to determine further network functionality (e.g., elevated security privileges) for one or more of unmanaged devices 320. NAC device 120 may provide the further network functionality to one or more of unmanaged devices 320.

In one example, NAC device 120 may provide host check rules (e.g., to managed devices 310) which may be used to identify installed software (e.g., anti-virus software) on a managed device 310. NAC device 120 may also provide a software development kit (SDK) for third parties to develop configuration analysis modules. Upon detecting a particular third party's anti-virus software on managed device 310, NAC device 120 may download the analysis module for the particular third party, and may parse a configuration of the anti-virus software. The parsed configuration of the anti-virus software might inform NAC device 120 that an unmanaged device 320 (e.g., associated with managed device 310) is more than just a Windows server executing hypertext transfer protocol (HTTP) services. Rather, based on the parsed configuration of the anti-virus software, NAC device 120 may determine that unmanaged device 320 is a third party (e.g., a Symantec) anti-virus signature server, and may provide unmanaged device 320 elevated security roles in network 100.

Although FIG. 3 shows components of network portion 300, in other implementations, network portion 300 may contain fewer components, different components, differently arranged components, or additional components than depicted in FIG. 3. Alternatively, or additionally, one or more components of network portion 300 may perform one or more other tasks described as being performed by one or more other components of network portion 300.

NAC Device Functional Configuration

Figure 4:
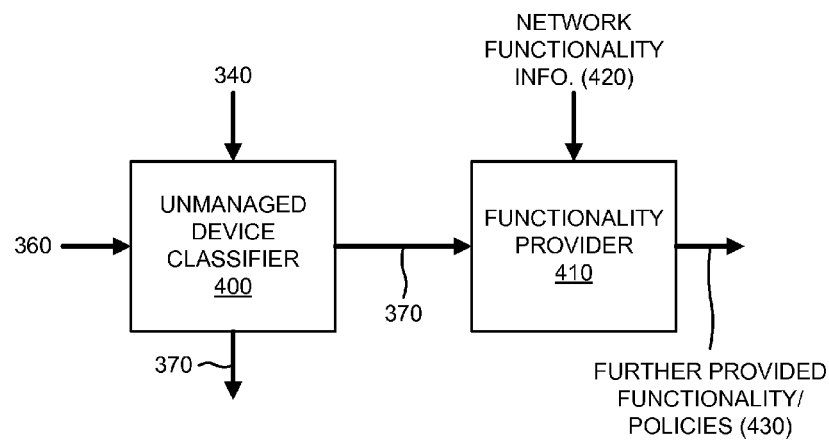
FIG. 4 is a diagram of functional components of a network admission control (NAC) device depicted in FIG. 3.

FIG. 4 is a diagram of functional components of a NAC device 120. In one example, the functional components described in connection with FIG. 4 may be implemented by one or more of the components of device 200 (FIG. 2). As shown, NAC device 120 may include an unmanaged device classifier 400 and a functionality provider 410.

Unmanaged device classifier 400 may include hardware or a combination of hardware and software that may receive endpoint information 340 from managed devices 310, and may receive UMD information 360 from UMD identifier device 130. Unmanaged device classifier 400 may identify or classify unmanaged devices 320 based on endpoint information 340 and UMD information 360, as indicated by reference number 370. Unmanaged device classifier 400 may provide classification 370 of unmanaged devices 320 to functionality provider 410 and to one or more other devices (e.g., managed devices 310).

Functionality provider 410 may include hardware or a combination of hardware and software that may receive classification 370 of unmanaged devices 320 from unmanaged device classifier 400, and may receive network functionality information 420 (e.g., from a network administrator, one or more other devices, one or more databases, etc.). Network functionality information 420 may include access policies, firewall policies, network privileges, network authorization, etc. associated with network 100. Functionality provider 410 may utilize classification 370 of unmanaged devices 320 and network functionality information 420 to determine further provided functionality/policies 430 (e.g., access policies, firewall policies, network privileges, network authorization, etc.) for one or more of unmanaged devices 320. Functionality provider 410 may provide further provided functionality/policies 430 to one or more of unmanaged devices 320.

Although FIG. 4 shows an example of functional components of NAC device 120, in other implementations, NAC device 120 may contain fewer functional components, different functional components, differently arranged functional components, or additional functional components than depicted in FIG. 4. Alternatively, or additionally, one or more functional components of NAC device 120 may perform one or more other tasks described as being performed by one or more other functional components of NAC device 120.

Examples of Operations for Classifying Unmanaged Devices

Figure 5:
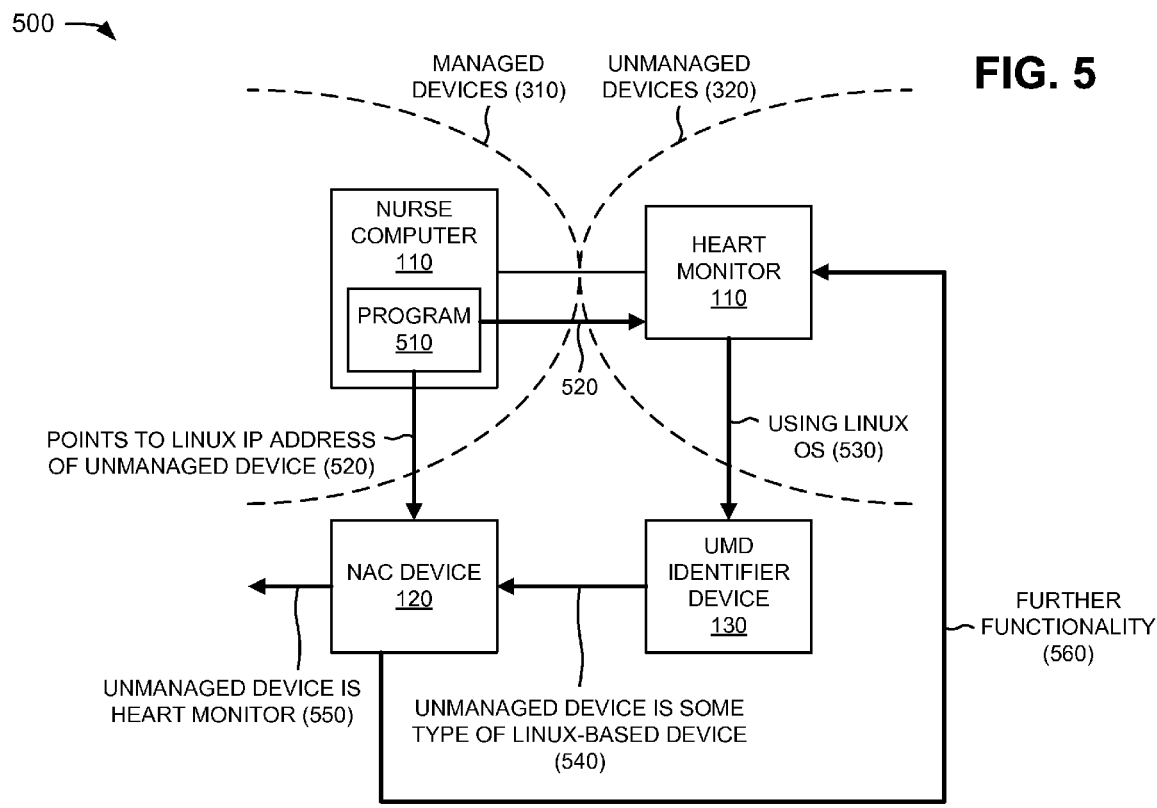
FIG. 5 is a diagram of example operations capable of being performed by a portion of the network depicted in FIG. 1.

FIG. 5 is a diagram of example operations capable of being performed by a portion 500 of network 100. As shown, network portion 500 may include a nurse computer 110, a heart monitor 110, NAC device 120, and UMD identifier device 130. Devices 110, NAC device 120, and UMD identifier device 130 may include the features described above in connection with one or more of FIGS. 1-4.

Nurse computer 110 may include a computing device (e.g., device 110), provided in a hospital environment, that performs functions to aid a nurse in performing her duties. In one example, nurse computer 110 may connect to various devices (e.g., heart monitor 110) that monitor patients provided in rooms of the hospital. As shown in FIG. 5, nurse computer 110 may be one of managed devices 310 and may include a program 510. In one example, program 510 may include a software program that interacts with various devices (e.g., heart monitor 110) monitoring patients. As further shown in FIG. 5, program 510 may not be able to identify heart monitor 110 (e.g., as a heart monitor device), but may point to a LINUX IP address of one of unmanaged devices 320 (e.g., of heart monitor 110), as indicated by reference number 520. Nurse computer 110 may provide information 520 identifying the LINUX IP address of heart monitor 110 to NAC device 120.

Heart monitor 110 may include a device that monitors a heart rate of a patient provided in a hospital room. As shown in FIG. 5, heart monitor 110 may be one of unmanaged devices 320, may include a LINUX IP address (e.g., pointed to by program 510), and may use a LINUX operating system (OS), as indicated by reference number 530. UMD identifier device 130 may extract (e.g., from heart monitor 110) information 530 indicating that heart monitor 110 uses a LINUX OS.

UMD identifier device 130 may utilize information 530 indicating that heart monitor 110 uses a LINUX OS to determine that heart monitor 110 is some type of LINUX-based device, as indicated by reference number 540. However, UMD identifier device 130 may not be able to completely identify heart monitor 110 based on information 530. Thus, information 540 indicating that heart monitor 110 is some type of LINUX-based device may provide a partial identification of heart monitor 110. UMD identifier device 130 may provide information 540 to NAC device 120.

NAC device 120 may receive information 520 from nurse computer 110 and may receive information 540 from UMD identifier device 130. Based on information 520 and information 540, NAC device 120 may determine that unmanaged device 320 connected to nurse computer 110 is a heart monitor 110, as indicated by reference number 550. For example, NAC device 120 may know that nurse computer 110 connects to several unmanaged devices 320 (e.g., patient monitoring devices), and may know that heart monitor 110 is the only type of patient monitoring device that uses a LINUX OS. Therefore, NAC device 120 may deduce that unmanaged device 320 is a heart monitor 110 based on this knowledge as well as information 520 and information 540. In one example, NAC device 120 may recognize a heart-monitoring software configuration on nurse computer 110 (e.g., based on information 520) that points to an unmanaged device 320 (e.g., heart monitor 110), and may classify heart monitor 110 based on this analysis. NAC device 120 may utilize determination 550 of heart monitor 110 to determine further network functionality 560 (e.g., elevated security privileges, firewall privileges, etc.) for heart monitor 110. NAC device 120 may provide further network functionality 560 to heart monitor 110.

Although FIG. 5 shows examples of components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

Figure 6:
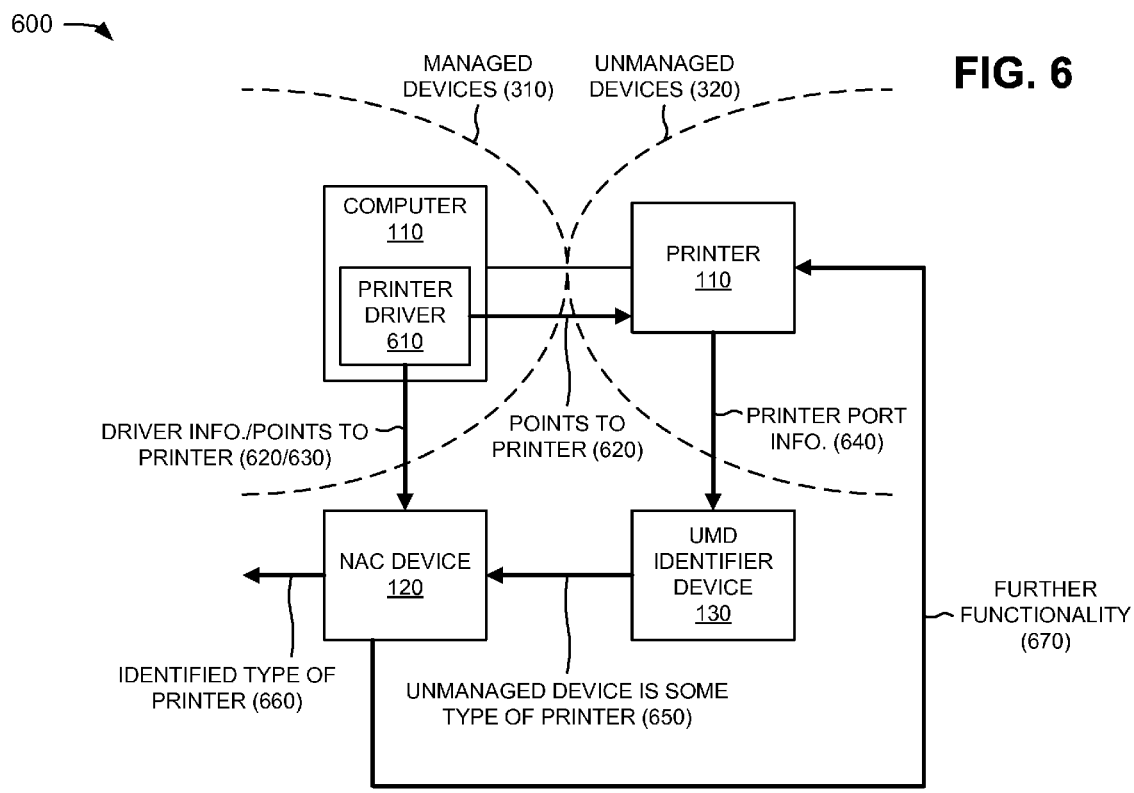
FIG. 6 is a diagram of additional example operations capable of being performed by a portion of the network depicted in FIG. 1.

FIG. 6 is a diagram of additional example operations capable of being performed by a portion 600 of network 100. As shown, network portion 600 may include a computer 110, a printer 110, NAC device 120, and UMD identifier device 130. Devices 110, NAC device 120, and UMD identifier device 130 may include the features described above in connection with one or more of FIGS. 1-5.

Computer 110 may include a computing device (e.g., device 110) that performs functions to aid a user of computer 110. In one example, computer 110 may connect to various output devices (e.g., printer 110) that enable computer 110 to output information (e.g., print a document). As shown in FIG. 6, computer 110 may be one of managed devices 310 and may include a printer driver 610. In one example, printer driver 610 may include a software program that converts information to be printed into a form specific for a printer (e.g., printer 110). Printer driver 610 may permit applications (e.g., provided on computer 110) to print information without being aware of technical details of printer 110. As further shown in FIG. 6, printer driver 610 may not be able to identify a model associated with printer 110, but may point to an IP address of one of unmanaged devices 320 (e.g., of printer 110), as indicated by reference number 620. Computer 110 may provide, to NAC device 120, information 620 identifying the IP address of printer 110 and information 630 (e.g., printer ports, printer preferences, printer settings, etc.) associated with printer driver 610.

Printer 110 may include a device that accepts text and graphic output information from computer 110 and transfers the information to paper. As shown in FIG. 6, printer 110 may be one of unmanaged devices 320, may include an IP address (e.g., pointed to by printer driver 610), and may be associated with a particular printer port. UMD identifier device 130 may extract (e.g., from printer 110) information 640 indicating the particular printer port associated with printer 110.

UMD identifier device 130 may utilize information 640 indicating the particular printer port associated with printer 110 to determine that printer 110 is some type of printer, as indicated by reference number 650. However, UMD identifier device 130 may not be able to completely identify printer 110 based on information 640. Thus, information 650 indicating that that printer 110 is some type of printer may provide a partial identification of printer 110. UMD identifier device 130 may provide information 650 to NAC device 120.

NAC device 120 may receive information 630 from computer 110 and may receive information 650 from UMD identifier device 130. Based on information 630 and information 650, NAC device 120 may determine that unmanaged device 320 connected to computer 110 is a specific type (e.g., a particular make and model number) of printer 110, as indicated by reference number 660. For example, NAC device 120 may examine information 650 to determine that computer 110 is connected to a printer, and may examine information 630 (e.g., provided by printer driver 610) to determine the type of printer connected to computer 110. NAC device 120 may utilize determination 660 of printer 110 to determine further network functionality 670 (e.g., elevated security privileges, firewall privileges, etc.) for printer 110. NAC device 120 may provide further network functionality 670 to printer 110.

Although FIG. 6 shows examples of components of network portion 600, in other implementations, network portion 600 may contain fewer components, different components, differently arranged components, or additional components than depicted in FIG. 6. Alternatively, or additionally, one or more components of network portion 600 may perform one or more other tasks described as being performed by one or more other components of network portion 600.

Network Interactions for Improving Network Location Awareness

Figure 7:
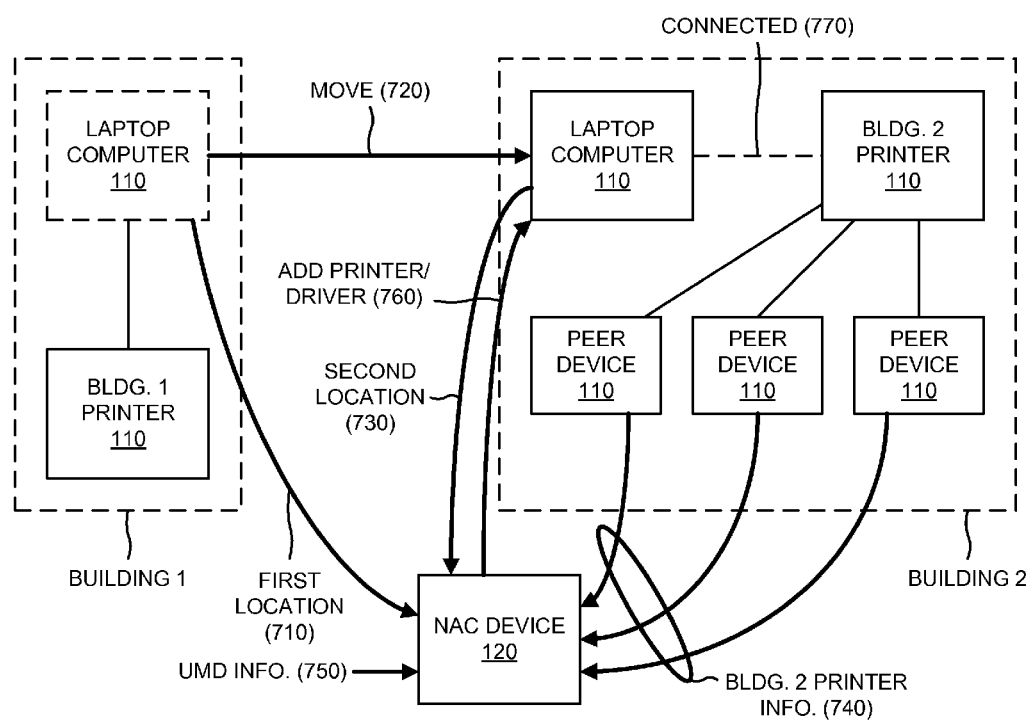
FIG. 7 is a diagram of further example operations capable of being performed by a portion of the network depicted in FIG. 1.

FIG. 7 is a diagram of further example operations capable of being performed by a portion 700 of network 100. As shown, network portion 700 may include a laptop computer 110, a building 1 printer 110, a building 2 printer 110, peer devices 110, and NAC device 120. Devices 110 and NAC device 120 may include the features described above in connection with one or more of FIGS. 1-6.

Laptop computer 110 may include a mobile computing device (e.g., device 110) that performs functions to aid a user of laptop computer 110. In one example, laptop computer 110 may connect to various output devices (e.g., building 1 printer 110, building 2 printer 110, etc.) that enable laptop computer 110 to output information (e.g., print a document). Building 1 printer 110 may include a device (e.g., located in building 1) that may accept text and graphic output information from laptop computer 110 and may transfer the information to paper. Building 2 printer 110 may include a device (e.g., located in building 2) that may accept text and graphic output information from laptop computer 110 and may transfer the information to paper.

As further shown in FIG. 7, laptop computer 110 may initially be located in building 1 and may be connected to building 1 printer 110. In one example, building 1 may be where an office (e.g., associated with a user of laptop computer 110) is located. Laptop computer 110 may provide a first location 710 of laptop computer 110 to NAC device 120 when laptop computer 110 is located in building 1. First location 710 may include a physical location (e.g., provided via network location awareness (NLA) techniques) of laptop computer 110. NAC device 120 may receive first location 710.

A user of laptop computer 110 may have a meeting in building 2, and may physically move laptop computer 110 to building 2 (e.g., to a conference room located in building 2), as indicated by reference number 720. Laptop computer 110 may provide a second location 730 of laptop computer 110 to NAC device 120 when laptop computer 110 is located in building 2. Second location 730 may include a physical location (e.g., provided via NLA techniques) of laptop computer 110 that is different from first location 710. NAC device 120 may receive second location 730.

As further shown in FIG. 7, laptop computer 110 may be located at second location 730 along with peer devices 110. Peer devices 110 may include devices 110 located in building 2 (e.g., adjacent to second location 730 of laptop computer 110) and connected to building 2 printer 110. Since peer devices 110 are connected to building 2 printer 110, NAC device 120 may extract functionality information (e.g., building 2 printer information 740) from peer devices 110. In one example, building 2 printer information 740 may include information obtained from printer drivers provided in peer devices 110. In one implementation, NAC device 120 may perform a host check of peer devices 110 that may determine (e.g., based on building 2 printer information 740) that peer devices 110 have the same printer drivers installed and configured for the same IP address (e.g., an IP address of building 2 printer 110). Based on the host check, NAC device 120 may determine that peer devices 110 are all connected to building 2 printer 110.

NAC device 120 may (optionally) receive UMD information 750 from UMD identifier device 130 (not shown). UMD information 750 may include information indicating that that building 2 printer 110 is some type of printer (e.g., information providing a partial identification of building 2 printer 110). Based on information 740 and UMD information 750, NAC device 120 may determine network-related functionality of peer devices 110 (e.g., that peer devices 110 are connected to a specific type (e.g., a particular make and model number) of printer 110), and may determine that laptop computer 110 (e.g., based on its location) should connect to building 2 printer 110. NAC device 120 may provide information 760 instructing laptop computer 110 to install a new printer and printer driver that would enable laptop computer 110 to connect to building 2 printer 110. Laptop computer 110 may receive information 760, may install a new printer/printer driver based on information 760, and may connect 770 with building 2 printer 110 after the new printer/printer driver is installed.

The arrangement depicted in FIG. 7 may utilize behavioral semantics of peer devices (e.g., to determine configurations of peer devices) with a particular device, and may be less reliant on network heuristics than traditional network location awareness techniques. For example, instead of merely relying on network topology to locate a nearby printer when laptop computer 110 changes locations, the arrangement depicted in FIG. 7 may effectively utilize information associated with a local network (e.g., local to laptop computer 110) as well as the behavior of peer devices 110.

Although FIG. 7 shows examples of components of network portion 700, in other implementations, network portion 700 may contain fewer components, different components, differently arranged components, or additional components than depicted in FIG. 7. Alternatively, or additionally, one or more components of network portion 700 may perform one or more other tasks described as being performed by one or more other components of network portion 700.

Figure 8A:
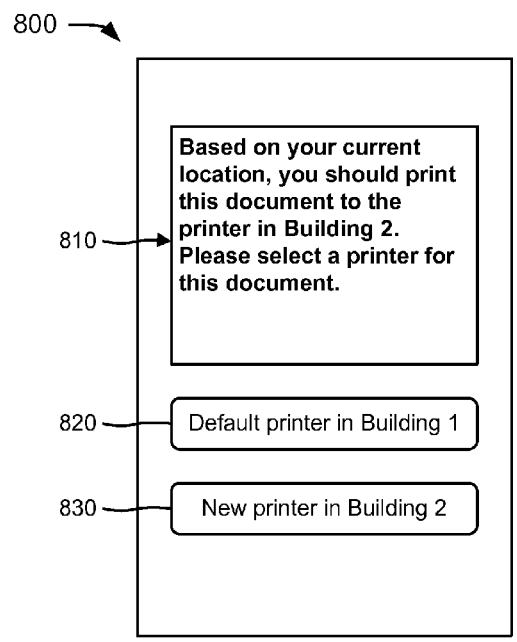
FIGS. 8A and 8B are diagrams of example user interfaces capable of being generated by a laptop computer depicted in FIG. 7.
Figure 8B:
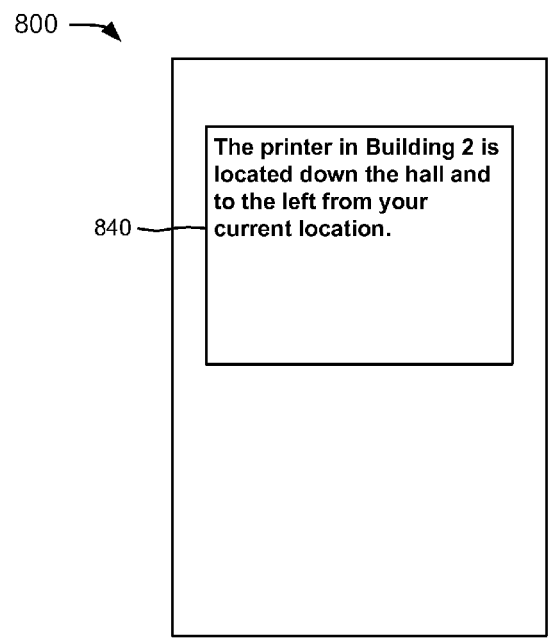

FIGS. 8A and 8B are diagrams of example user interfaces 800 capable of being generated by laptop computer 110 depicted in FIG. 7. User interfaces 800 may include graphical user interfaces (GUIs) or non-graphical user interfaces, such as text-based interfaces. User interfaces 800 may provide information to users via customized interfaces (e.g., proprietary interfaces) and/or other types of interfaces (e.g., browser-based interfaces, etc.). User interfaces 800 may receive user inputs via one or more input devices, may be user-configurable (e.g., a user may change the size of user interfaces 800, information displayed in user interfaces 800, color schemes used by user interfaces 800, positions of text, images, icons, windows, etc., in user interfaces 800, etc.), and/or may not be user-configurable. Information associated with user interfaces 800 may be selected and/or manipulated by a user of laptop computer 110.

When laptop computer 110 receives information 760 (FIG. 7) instructing laptop computer 110 to install a new printer and printer driver, laptop computer 110 may install the new printer/printer driver (e.g., for building 2 printer 110). When the user of laptop computer 110 decides to print a document, laptop computer 110 may present user interface 800 depicted in FIG. 8A. As shown, user interface 800 may provide a window 810 that includes instructions associated with printing a document via laptop computer 110. For example, window 810 may provide options for selecting a printer to print a document (e.g., "Based on your current location, you should print this document to the printer in Building 2. Please select a printer for this document."). User interface 800 may also provide a selection mechanism 820 (e.g., a button, an icon, etc.) for building 1 printer 110 (e.g., "Default printer in Building 1") and a selection mechanism 830 (e.g., a button, an icon, etc.) for building 2 printer 110 (e.g., "New printer in Building 2").

If the user of laptop computer 110 selects mechanism 830 (e.g., "New printer in Building 2"), user interface 800 may provide a window 840 with directions to a physical location of building 2 printer 110. For example, window 840 may state: "The printer in Building 2 is located down the hall and to the left from your current location." Such information may be helpful to the user of laptop computer 110 since the user may be unfamiliar with the location of building 2 printer 110 (e.g., since the user's office in building 1).

Although user interfaces 800 of FIGS. 8A and 8B depict a variety of information, in other implementations, user interfaces 800 may depict less information, different information, differently arranged information, or additional information than depicted in FIGS. 8A and 8B.

Process Examples

Figure 9:
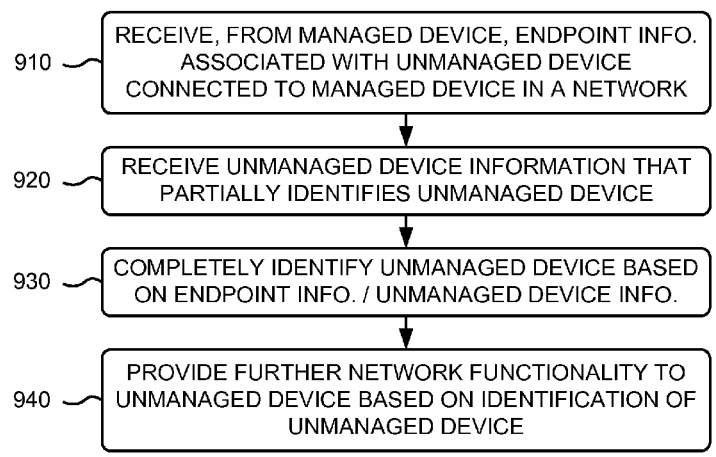
FIGS. 9 and 10 are flow charts of a process for using endpoint host checking to classify unmanaged devices in a network according to implementations described herein.
Figure 10:
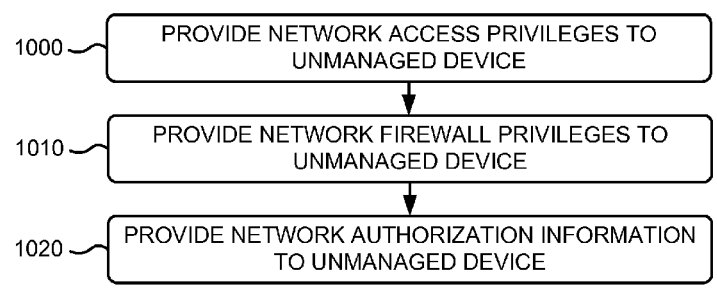

FIGS. 9 and 10 are flow charts of a process 900 for using endpoint host checking to classify unmanaged devices in a network according to implementations described herein. In one implementation, process 900 may be performed by NAC device 120. In another implementation, some or all of process 900 may be performed by another device or group of devices, including or excluding NAC device 120.

As illustrated in FIG. 9, process 900 may include receiving, from a managed device, endpoint information associated with an unmanaged device connected to the managed device in a network (block 910), and receiving unmanaged device information that partially identifies the unmanaged device (block 920). For example, in implementations described above in connection with FIG. 3, NAC device 120 may receive or extract endpoint information 340 from managed devices 310. Endpoint information 340 may include information obtained from checks to identify configuration settings of managed devices 310 for endpoint devices 110-1/110-2, interactions of managed devices 310 with external devices, and/or other information associated with endpoint devices 110-1/110-2. UMD information 360 may include partial identifications (e.g., with a less than 100% confidence level) of unmanaged devices 320. In one example, UMD identifier device 130 may compare information 350 to information contained in a database of network-attached endpoint devices, and may assign an identity value (e.g., UMD information 360) to each of unmanaged devices 320. UMD identifier device 130 may provide UMD information 360 to NAC device 120. NAC device 120 may receive UMD information 360.

As further shown in FIG. 9, process 900 may include completely identifying the unmanaged device based on the endpoint information and the unmanaged device information (block 930), and providing further network functionality to the unmanaged device based on the identification of the unmanaged device (block 940). For example, in implementations described above in connection with FIG. 3, NAC device 120 may completely identify or classify unmanaged devices 320 based on endpoint information 340 and UMD information 360, as indicated by reference number 370. In one implementation, NAC device 120 may utilize classification 370 of unmanaged devices 320 to determine further network functionality (e.g., elevated security privileges) for one or more of unmanaged devices 320. NAC device 120 may provide the further network functionality to one or more of unmanaged devices 320.

Process block 940 may include the process blocks depicted in FIG. 10. As shown in FIG. 10, process block 940 may include one or more of providing network access privileges to the unmanaged device (block 1000), providing network firewall privileges to the unmanaged device (block 1010), and providing network authorization information to the unmanaged device (block 1020). For example, in implementations described above in connection with FIG. 4, functionality provider 410 of NAC device 120 may receive classification 370 of unmanaged devices 320 from unmanaged device classifier 400, and may receive network functionality information 420 (e.g., from a network administrator, one or more other devices, one or more databases, etc.). Network functionality information 420 may include access policies, firewall policies, network privileges, network authorization, etc. associated with network 100. Functionality provider 410 may utilize classification 370 of unmanaged devices 320 and network functionality information 420 to determine further provided functionality/policies 430 (e.g., access policies, firewall policies, network privileges, network authorization, etc.) for one or more of unmanaged devices 320. Functionality provider 410 may provide further provided functionality/policies 430 to one or more of unmanaged devices 320.

Figure 11:
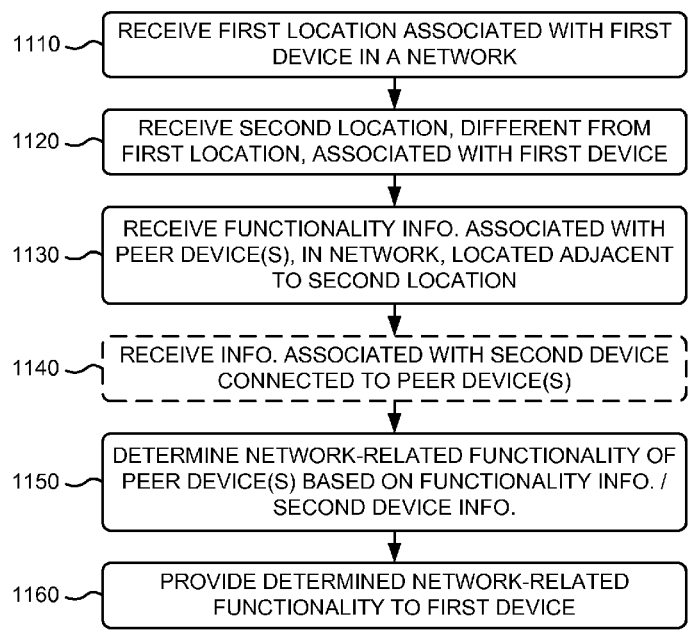
FIGS. 11 and 12 are flow charts of a process for using endpoint host checking to improve network location awareness according to implementations described herein.
Figure 12:
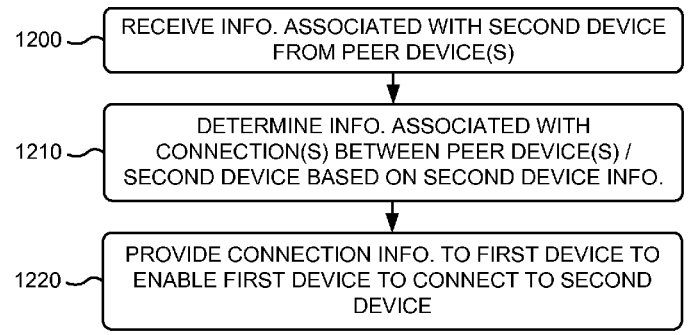

FIGS. 11 and 12 are flow charts of a process 1100 for using endpoint host checking to improve network location awareness according to implementations described herein. In one implementation, process 1100 may be performed by NAC device 120. In another implementation, some or all of process 1100 may be performed by another device or group of devices, including or excluding NAC device 120.

As illustrated in FIG. 11, process 1100 may include receiving a first location associated with a first device in a network (block 1110), and receiving a second location, different from the first location, associated with the first device (block 1120). For example, in implementations described above in connection with FIG. 7, laptop computer 110 may provide first location 710 of laptop computer 110 to NAC device 120 when laptop computer 110 is located in building 1. First location 710 may include a physical location (e.g., provided via NLA techniques) of laptop computer 110. NAC device 120 may receive first location 710. A user of laptop computer 110 may physically move laptop computer 110 to building 2 (e.g., to a conference room located in building 2), as indicated by reference number 720. Laptop computer 110 may provide second location 730 of laptop computer 110 to NAC device 120 when laptop computer 110 is located in building 2. Second location 730 may include a physical location (e.g., provided via NLA techniques) of laptop computer 110 that is different from first location 710. NAC device 120 may receive second location 730.

As further shown in FIG. 11, process 1100 may include receiving functionality information associated with one or more peer devices, in the network, located adjacent to the second location (block 1130), and, optionally, receiving information associated with a second device connected to the peer device(s) (block 1140). For example, in implementations described above in connection with FIG. 7, laptop computer 110 may be located at second location 730 along with peer devices 110. Peer devices 110 may include devices 110 located in building 2 (e.g., adjacent to second location 730 of laptop computer 110) and connected to building 2 printer 110. Since peer devices 110 are connected to building 2 printer 110, NAC device 120 may extract functionality information (e.g., building 2 printer information 740) from peer devices 110. In one example, building 2 printer information 740 may include information obtained from printer drivers provided in peer devices 110. NAC device 120 may also receive UMD information 750 from UMD identifier device 130 (not shown). UMD information 750 may include information indicating that that building 2 printer 110 is some type of printer (e.g., information providing a partial identification of building 2 printer 110).

Returning to FIG. 11, process 1100 may include determining network-related functionality of peer device(s) based on the functionality information and the second device information (block 1150), and providing the determined network-related functionality to the first device (block 1160). For example, in implementations described above in connection with FIG. 7, based on information 740 and UMD information 750, NAC device 120 may determine network-related functionality of peer devices 110 (e.g., that peer devices 110 are connected to a specific type (e.g., a particular make and model number) of printer 110). NAC device 120 may provide information 760 instructing laptop computer 110 to install a new printer and printer driver that would enable laptop computer 110 to connect to building 2 printer 110 (e.g., like peer devices 110).

Process blocks 1130-1160 may include the process blocks depicted in FIG. 12. As shown in FIG. 12, process blocks 1130-1160 may include receiving information associated with the second device from the peer device(s) (block 1200), determining information associated with connection(s) between the peer device(s) and the second device based on the second device information (block 1210), and providing the connection information to the first device to enable the first device to connect to the second device (block 1220). For example, in implementations described above in connection with FIG. 7, based on information 740 and UMD information 750, NAC device 120 may determine that peer devices 110 are connected to a specific type (e.g., a particular make and model number) of printer 110, and may determine that laptop computer 110 (e.g., based on its location) should connect to building 2 printer 110. NAC device 120 may provide information 760 instructing laptop computer 110 to install a new printer and printer driver that would enable laptop computer 110 to connect to building 2 printer 110. Laptop computer 110 may receive information 760, may install the new printer/printer driver based on information 760, and may connect 770 with building 2 printer 110 after the new printer/printer driver is installed.

CONCLUSION

Implementations described herein may provide systems and/or methods that use endpoint host checking to classify unmanaged devices in a network and to improve network location awareness.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-12, the order of the blocks may be modified in other implementations. Further, non-dependent blocks may be performed in parallel.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, information identifying a first location associated with a first device in a network;
   receiving, by the computing device, information identifying a second location associated with the first device, the second location being different than the first location;
   receiving, by the computing device, functionality information associated with a peer device in the network, the peer device being associated with the second location;
   receiving, by the computing device, information associated with a second device connected to the peer device; and
   determining, by the computing device, network-related functionality of the peer device based on the functionality information and the information associated with the second device.

2. The method of claim 1, further comprising:
   providing the determined network-related functionality to the first device to enable the first device to implement the network-related functionality.

3. The method of claim 1, where the information associated with the second device is provided by the peer device, the method further comprising:
   determining information associated with a connection between the peer device and the second device based on the information associated with the second device; and
   providing the information associated with the connection between the peer device and the second device to the first device to enable the first device to connect to the second device.

4. The method of claim 1, where the computing device includes a network admission control (NAC) device.

5. A device, comprising:
   a processor to:
   receive information identifying a location associated with a first device in a network,
   receive functionality information associated with a peer device in the network, the peer device being located adjacent to the location associated with the first device,
   receive information associated with a second device connected to the peer device, and
   determine network-related functionality of the peer device based on the functionality information and the information associated with the second device.

6. The device of claim 5, where the processor is further to:
   provide the determined network-related functionality to the first device.

7. The device of claim 6, where the first device automatically implements the determined network-related functionality.

8. The device of claim 5, where the information associated with the second device is provided by the peer device, and where the processor is further to:
   determine information associated with a connection between the peer device and the second device based on the information associated with the second device, and
   provide information associated with the connection between the peer device and the second device to the first device to enable the first device to connect to the second device.

9. The device of claim 5, where each of the first device, the second device, and the peer device includes a managed device.

10. The device of claim 9, where the managed device includes:
    a host checking client to:
    obtain information associated with accessing the network.

11. The device of claim 5, where the second device includes an unmanaged device.

12. The device of claim 11, where the unmanaged device fails to include a host checking client to obtain information associated with accessing the network.

13. A non-transitory computer-readable medium storing instructions, the instructions comprising:
    one or more instructions that, when executed by a processor, cause the processor to:
    receive information identifying a first location associated with a first device in a network,
    receive functionality information associated with a second device in the network,
    the second device being associated with a second location that is located adjacent to the first location,
    receive information associated with a third device that is connected to the second device, and
    determine a network-related functionality of the second device based on the functionality information and the information associated with the third device.

14. The non-transitory computer-readable medium of claim 13, where the instructions further comprise:
    one or more instructions to provide the determined network-related functionality to the first device,
    where the first device automatically implements the determined network-related functionality.

15. The non-transitory computer-readable medium of claim 13, where the information associated with the third device is provided by the second device, and
    where the instructions further comprise:
    one or more instructions to determine information associated with a connection between the second device and the third device based on the information associated with the third device, and
    one or more instructions to provide the connection information to the first device to enable the first device to connect to the third device.

16. The non-transitory computer-readable medium of claim 13, where each of the first device, the second device, and the third device includes a managed device.

17. The non-transitory computer-readable medium of claim 16, where the managed device includes a host checking client that obtains information associated with accessing the network.

18. The non-transitory computer-readable medium of claim 13, where the third device includes an unmanaged device.

* * * * *